UNITED STATES PATENT OFFICE.

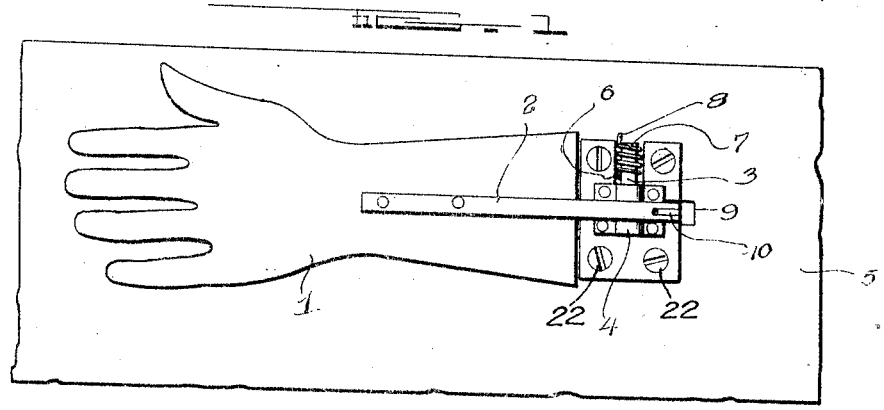
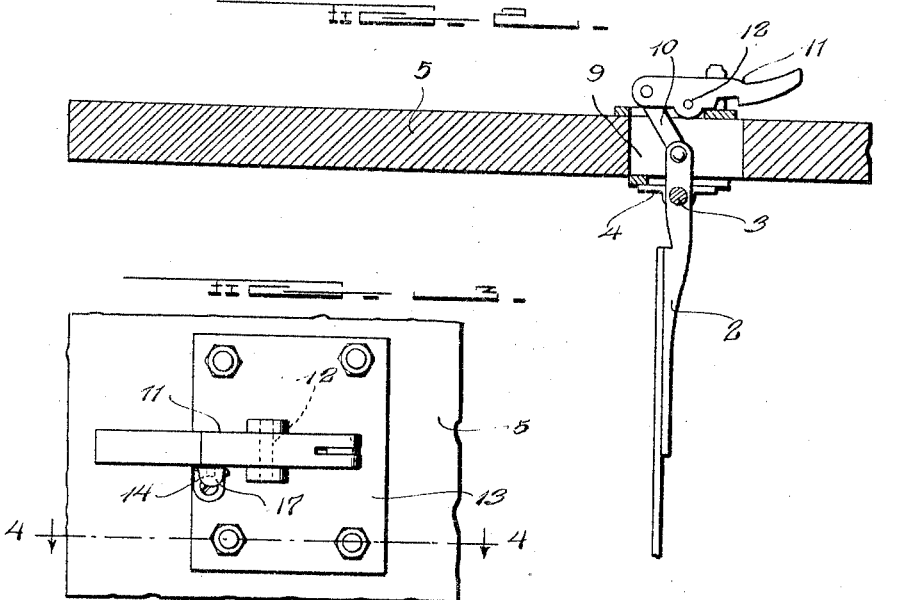
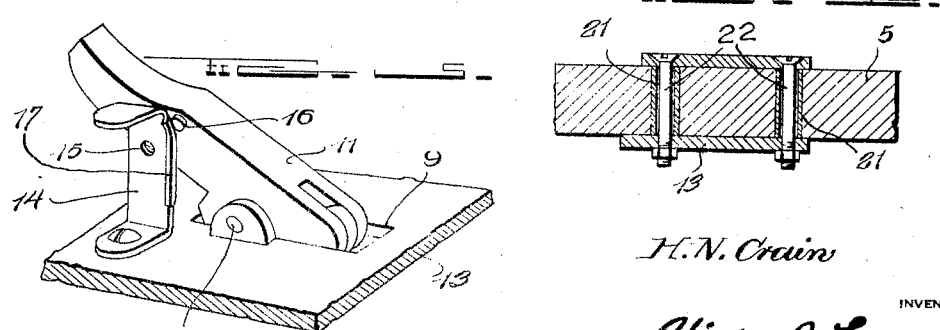

HENRY N. CRAIN, OF DENVER, COLORADO.

AUTOMOBILE DIRECTION-SIGNAL.

1,367,355.  Specification of Letters Patent.  Patented Feb. 1, 1921.

Application filed July 30, 1920. Serial No. 399,997.

*To all whom it may concern:*

Be it known that I, HENRY N. CRAIN, a citizen of the United States, residing at Denver city, in the county of Denver and State of Colorado, have invented new and useful Improvements in Automobile Direction-Signals, of which the following is a specification.

The object of my present invention is the provision of an automobile direction signal embodying means whereby the signal arm may be retained in extended position incident to the making of a turn, thereby leaving the driver's hands free for the operation of the automobile; the arrangement being such that after the making of the turn the driver by moving the retaining means can bring about the restoration of the arm to its normal position close against the outer side of the automobile door.

To the attainment of the foregoing the invention consists in the improvement as hereinafter described and definitely claimed.

In the accompanying drawings, hereby made a part hereof:—

Figure 1 is an elevation showing the outer side of an automobile door equipped with my improvement; the signal arm being shown in its idle position close against and in parallelism with the door.

Fig. 2 is a horizontal section taken through the door in a plane above my improvement and showing the movable brace in the positions they occupy when the signal arm is in its extended position.

Fig. 3 is a detail elevation showing the portion of the improvement at the inner side of the automobile door and as the same parts when the signal arm is in its extended position.

Fig. 4 is a horizontal section taken in the plane indicated by the line 4—4 of Fig. 3, looking downwardly.

Fig. 5 is a detail view illustrative of the manner in which the retaining means engage the actuating arm of the improvement to hold the signal arm thereof in extended position.

Similar numerals of reference designate corresponding parts in all of the views of the drawings.

The signal arm 1 of my improvement is shaped and embellished to simulate a portion of a human arm. It may be and preferably is formed of sheet metal, and has fixed to it a shank 2, fixed to which is an upright pintle 3. The said pintle 3 is journaled in bearings 4 carried at the outer side of an automobile door 5, and is provided with a stud 6 for the connection of a spring 7 that is coiled about the pintle and is also secured to the automobile door at the point 8. By virtue of the said arrangement of the spring, the spring tends to move the signal arm 1 flat against the outer side of the door 5 and to yieldingly hold the said arm in said position. The shank 2 extends rearwardly beyond the pintle 3, and connected to the rear portion of the shank and extending through a transverse opening 9 in the door 5 is a link 10. The said link 10 is adapted to play through the said opening 9, and the inner end of the link is pivotally connected to the bifurcated arm of an actuating lever 11. The said actuating lever 11 is pivotally connected at 12 to a bracket plate 13 fixed to the inner side of the door. From this it follows that when the innermost and exposed arm of the lever 11 is moved rearwardly, the signal arm 1 will also be swung rearwardly until said signal arm rests in extended position at approximate right angles to the outer side of the door. It will also be observed that immediately following the release of the inner arm of the actuating lever 11, the spring 7 will move the signal arm 1 to its idle position alongside of and close against the door 5 where the signal arm will be entirely out of the way.

In order to yieldingly retain the signal arm in extended position as when the automobile is making a turn so as to leave the hands of the driver free for the guidance and control of the automobile I provide retaining means which as best shown in Figs. 3 and 5 is in the form of a spring plate 14 carried by and extending laterally from the bracket plate 13. The plate 14 is apertured at 15 to receive a stud 16 on the inner arm of the lever 11, and is also provided on its forward edge with a lip or beveled portion 17. From this it follows that when the lever 11 is swung rearwardly to extend the signal arm 1, the stud 16 on said lever will ride on the retaining latch 14 and will enter the aperture 15 in said latch, whereupon the signal arm will be strongly and safely retained in extended position. When, however, the retaining spring or latch 14 is moved downwardly to release the stud 16, the spring 7 will operate to quickly restore the signal arm 1 to its idle position.

It will be observed that the tubes 21 are interposed between the inner and outer plates to maintain said plates in spaced relation and to receive the bolts 22 best shown in Fig. 4 that fasten the parts together.

I would further have it understood that the arm and hand comprised in my improvement may be made to correspond in color with the body of the car to which the signal is applied.

Having described my invention, what I claim and desire to secure by Letters-Patent, is:—

In an automobile direction signal, the combination of supporting means having a transverse opening therein, bearings at the outer side of said supporting means, a signal arm having a pintle at an intermediate point of its length journaled in said bearings, a spring surrounding said pintle and arranged to move and yieldingly hold the signal arm against the outer side of the supporting means, an actuating lever fulcrumed at an intermediate point in its length at the inner side of the supporting means and having a lateral stud on one of its arms, a link connecting the other arm of said lever with the inner portion of the signal arm, and a spring latch carried at and extending laterally from the inner side of the supporting means and having an aperture to receive the lateral stud of the actuating arm and also having a lip on its edge adjacent to the fulcrum of the lever, over which said stud is arranged to ride *en route* to said aperture.

In testimony whereof I affix my signature.

HENRY N. CRAIN.